United States Patent
Wang et al.

(10) Patent No.: US 8,366,002 B2
(45) Date of Patent: Feb. 5, 2013

(54) SOLID ELASTIC LENS ELEMENT AND METHOD OF MAKING SAME

(75) Inventors: Ynjiun Paul Wang, Cupertino, CA (US); Chen Feng, Snohomish, WA (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 106 days.

(21) Appl. No.: 12/787,665

(22) Filed: May 26, 2010

(65) Prior Publication Data

US 2011/0290887 A1    Dec. 1, 2011

(51) Int. Cl.
G06K 7/10    (2006.01)
G06K 7/14    (2006.01)

(52) U.S. Cl. .............. 235/454; 235/462.01; 235/462.14; 235/462.45; 235/462.49; 235/472.01

(58) Field of Classification Search ................. 235/454, 235/462.01–462.49, 472.01–472.03; 264/1.7, 264/2.6; 359/642–797, 819, 821, 822, 829, 359/830

See application file for complete search history.

(56) References Cited

U.S. PATENT DOCUMENTS

| | | | |
|---|---|---|---|
| 4,289,379 A | 9/1981 | Michelet | |
| 4,407,567 A | 10/1983 | Michelet et al. | |
| 4,514,048 A | 4/1985 | Rogers | |
| 4,763,987 A * | 8/1988 | Ando | 359/826 |
| 4,783,153 A | 11/1988 | Kushibiki et al. | |
| 4,783,155 A | 11/1988 | Imataki et al. | |
| 4,802,746 A | 2/1989 | Baba et al. | |
| 5,113,445 A | 5/1992 | Wang | |
| 5,243,655 A | 9/1993 | Wang | |
| 5,337,361 A | 8/1994 | Wang et al. | |
| 5,389,222 A | 2/1995 | Shahinpoor | |
| 5,393,965 A | 2/1995 | Bravman et al. | |
| 5,401,944 A | 3/1995 | Bravman et al. | |
| 5,471,533 A | 11/1995 | Wang et al. | |
| 5,489,158 A | 2/1996 | Wang et al. | |
| 5,513,264 A | 4/1996 | Wang et al. | |
| 5,579,487 A | 11/1996 | Meyerson et al. | |
| 5,646,389 A | 7/1997 | Bravman et al. | |
| 5,659,167 A | 8/1997 | Wang et al. | |
| 5,710,419 A | 1/1998 | Wang et al. | |

(Continued)

FOREIGN PATENT DOCUMENTS

| | | |
|---|---|---|
| JP | 2010157222 A | 7/2010 |
| JP | 2010170561 A | 8/2010 |

(Continued)

*Primary Examiner* — Tuyen K Vo
(74) *Attorney, Agent, or Firm* — Heslin Rothenberg Farley & Mesiti P.C.

(57) ABSTRACT

A lens element is provided that includes a housing defining a center bore and an optical axis, and a light transmissive cover coupled to the housing. A first elastic solid lens is disposed within the housing adjacent the light transmissive cover, and is characterized by a first thickness and a first durometer hardness. A second elastic solid lens is disposed in the housing adjacent to and substantially conforming to the first elastic solid lens, and is characterized by a second thickness and a second durometer hardness. The second lens thickness is less than the first lens thickness, and the second durometer hardness is greater than the first durometer hardness. In one embodiment, the first durometer hardness is less than OO60 as measured by the Shore method, and the second durometer hardness is in the range of A20 to A60 as measured by the Shore method.

29 Claims, 10 Drawing Sheets

U.S. PATENT DOCUMENTS

| | | | |
|---|---|---|---|
| 5,742,263 A | 4/1998 | Wang et al. | |
| 5,793,033 A | 8/1998 | Feng et al. | |
| 5,818,023 A | 10/1998 | Meyerson et al. | |
| 5,834,754 A | 11/1998 | Feng et al. | |
| 5,866,888 A | 2/1999 | Bravman et al. | |
| 5,880,453 A | 3/1999 | Wang et al. | |
| 5,917,657 A | 6/1999 | Kaneko et al. | |
| 5,917,913 A | 6/1999 | Wang | |
| 6,175,922 B1 | 1/2001 | Wang | |
| 6,282,656 B1 | 8/2001 | Wang | |
| 6,594,759 B1 | 7/2003 | Wang | |
| 6,850,916 B1 | 2/2005 | Wang | |
| 6,992,843 B2 * | 1/2006 | Juhala | 359/819 |
| 7,065,344 B2 | 6/2006 | O'Hagan et al. | |
| 7,089,214 B2 | 8/2006 | Wang | |
| 7,107,246 B2 | 9/2006 | Wang | |
| 7,293,712 B2 | 11/2007 | Wang | |
| 7,364,081 B2 | 4/2008 | Havens et al. | |
| 7,568,628 B2 | 8/2009 | Wang et al. | |
| 7,611,060 B2 | 11/2009 | Wang et al. | |
| 7,635,084 B2 | 12/2009 | Wang et al. | |
| 7,717,343 B2 | 5/2010 | Havens et al. | |
| 7,793,840 B2 * | 9/2010 | Vinogradov | 235/454 |
| 7,813,047 B2 | 10/2010 | Wang et al. | |
| 7,909,257 B2 | 3/2011 | Wang et al. | |
| 7,918,398 B2 | 4/2011 | Li et al. | |
| 7,922,088 B2 | 4/2011 | Wang | |
| 7,946,493 B2 | 5/2011 | Havens et al. | |
| 8,016,189 B2 | 9/2011 | Wang et al. | |
| 8,027,095 B2 | 9/2011 | Havens | |
| 8,027,096 B2 | 9/2011 | Feng et al. | |
| 8,038,066 B2 | 10/2011 | Havens et al. | |
| 8,083,148 B2 | 12/2011 | Wang et al. | |
| 8,146,820 B2 | 4/2012 | Wang et al. | |
| 2002/0023215 A1 | 2/2002 | Wang et al. | |
| 2002/0052185 A1 | 5/2002 | O'Hagan et al. | |
| 2002/0123967 A1 | 9/2002 | Wang | |
| 2003/0004827 A1 | 1/2003 | Wang | |
| 2004/0189981 A1 * | 9/2004 | Ross et al. | 356/124 |
| 2005/0145698 A1 | 7/2005 | Havens et al. | |
| 2005/0152049 A1 * | 7/2005 | Juhala | 359/819 |
| 2005/0199725 A1 * | 9/2005 | Craen et al. | 235/462.22 |
| 2006/0007398 A1 * | 1/2006 | Akiyama | 353/20 |
| 2006/0007840 A1 * | 1/2006 | Hayashi et al. | 369/112.23 |
| 2006/0071081 A1 | 4/2006 | Wang | |
| 2006/0086596 A1 | 4/2006 | Lee et al. | |
| 2006/0202036 A1 | 9/2006 | Wang et al. | |
| 2006/0202038 A1 | 9/2006 | Wang et al. | |
| 2007/0063048 A1 | 3/2007 | Haven et al. | |
| 2007/0080280 A1 | 4/2007 | Havens | |
| 2007/0089168 A1 | 4/2007 | Wang et al. | |
| 2007/0091472 A1 * | 4/2007 | Alkemper et al. | 359/796 |
| 2007/0116858 A1 | 5/2007 | Benslimane et al. | |
| 2007/0133200 A1 * | 6/2007 | Uke et al. | 362/202 |
| 2007/0156021 A1 | 7/2007 | Morse et al. | |
| 2007/0158428 A1 | 7/2007 | Havens et al. | |
| 2008/0053845 A1 * | 3/2008 | Newman | 206/5.1 |
| 2008/0144185 A1 | 6/2008 | Wang et al. | |
| 2008/0144186 A1 | 6/2008 | Feng et al. | |
| 2009/0052049 A1 * | 2/2009 | Batchko et al. | 359/666 |
| 2009/0072038 A1 | 3/2009 | Li et al. | |
| 2009/0088203 A1 | 4/2009 | Havens et al. | |
| 2009/0108072 A1 | 4/2009 | Wang | |
| 2009/0135503 A1 * | 5/2009 | Nakai | 359/793 |
| 2010/0044440 A1 | 2/2010 | Wang et al. | |
| 2010/0090007 A1 | 4/2010 | Wang et al. | |
| 2010/0147956 A1 | 6/2010 | Wang et al. | |
| 2010/0276490 A1 | 11/2010 | Havens et al. | |
| 2010/0276491 A1 | 11/2010 | Havens et al. | |
| 2010/0276492 A1 | 11/2010 | Wang et al. | |
| 2010/0276493 A1 | 11/2010 | Havens et al. | |
| 2011/0004557 A1 | 1/2011 | Wang et al. | |
| 2011/0006117 A1 | 1/2011 | Wang | |
| 2011/0017829 A1 | 1/2011 | Wang et al. | |
| 2011/0036908 A1 | 2/2011 | Havens et al. | |
| 2011/0036911 A1 | 2/2011 | Havens et al. | |
| 2011/0089245 A1 | 4/2011 | Havens et al. | |
| 2011/0163165 A1 | 7/2011 | Liu et al. | |
| 2011/0163166 A1 | 7/2011 | Wang et al. | |
| 2011/0174880 A1 | 7/2011 | Li et al. | |
| 2011/0188752 A1 | 8/2011 | Wang | |
| 2011/0212751 A1 | 9/2011 | Havens et al. | |
| 2011/0290887 A1 | 12/2011 | Wang et al. | |
| 2011/0309145 A1 | 12/2011 | Richardson et al. | |

FOREIGN PATENT DOCUMENTS

| | | |
|---|---|---|
| WO | 2006121659 A1 | 11/2006 |

* cited by examiner

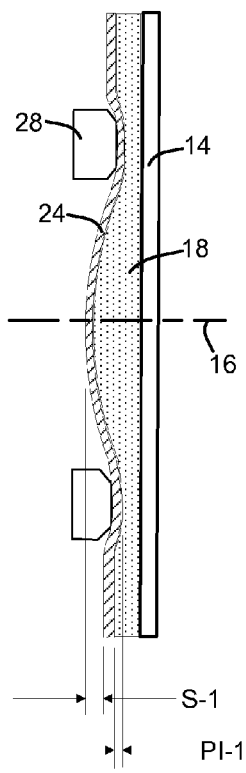
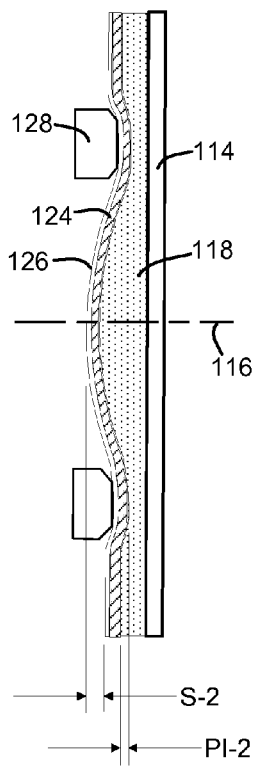
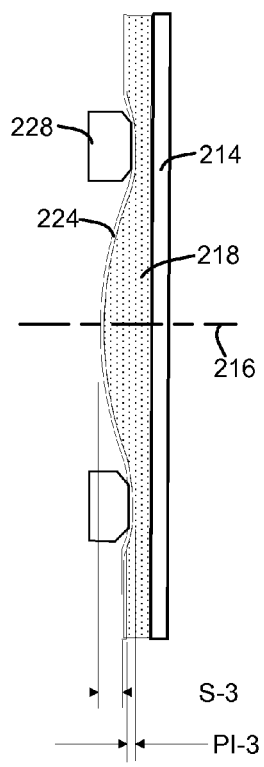
FIG. 7  FIG. 8  FIG. 9
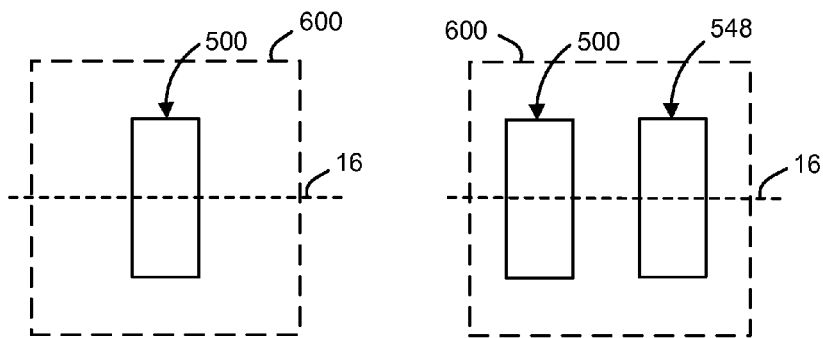
FIG. 10  FIG. 11

SOLID ELASTIC LENS ELEMENT AND METHOD OF MAKING SAME

FIELD OF THE INVENTION

This disclosure relates generally to a lens element for incorporation into an optical imaging system and, more specifically, to a lens element comprising a plurality of solid elastic lenses.

BACKGROUND OF THE INVENTION

Variable lenses, e.g., multiple focus lenses and zoom lenses have traditionally employed one or more non-deformable (i.e., rigid such as glass or polycarbonate) lens elements which are moved along an imaging axis by forces often supplied by a motor.

In recent years, motorless electro-responsive lens elements have attracted increased attention of researchers and designers of optical systems. One type of motorless electro-responsive lens element is the "fluid lens" lens element which generally includes a rigid or elastomeric membrane filled with one or more fluids having indices of refraction greater than 1. Fluid lens element technology has attracted the attention of many designers of optical systems who generally see traditional solid lens elements and motor equipped systems as bulky and energy hungry. With the proposals for fluid lens elements there have been proposed various methods for varying an optical property of a fluid lens element for integration into an optical system. Where fluid lens elements have been proposed, the proposed alternatives for varying optical properties of such lens elements can be categorized into three broad categories: electro wetting, fluid injection, and mechanically actuation.

According to a process of electro wetting, a fluid lens element is provided having at least two immiscible fluids and a voltage is applied to the fluid lens element. A surface tension of the fluid lens element changes as a result of the voltage being applied, bringing about a change in the curvature of an interface between the at least two fluids.

According to a process of fluid injection, a pump is provided adjacent a fluid lens element which pumps in and draws out fluid from the lens element. As fluid is pumped in and drawn out of the lens element, optical properties of the lens element change.

According to a process of mechanical actuation, a lens element is provided having a deformable membrane being secured within a housing, and a focus fluid confined to a cavity defined by the housing, the membrane, and an end plate. An actuator imparts a force to the membrane, which changes the geometry of the cavity holding the focus fluid.

Problems have been noted with all three methods for varying an optical property of a fluid lens element. Regarding electro wetting, one problem that has been noted is that the electrical current repeatedly flowing through the lens element tends to alter the characteristics of the lens element over time, rendering any system in which the lens element is employed unreliable and unpredictable. Another problem noted with proposals involving electro wetting is that electro wetting normally involves providing two types of fluids. As the reference index difference between the fluids is small, the power of the lens element is reduced.

Regarding the fluid injection methods, the pumps for providing such fluid injection are necessarily complex and intricate making a reasonably costly system and acceptable miniaturization difficult to achieve.

Regarding the mechanical actuation methods, manufacture of the lens element assembly has proven problematic due to the difficulty in handling the focus fluid. Furthermore, the assembly cannot sustain high temperature operation (e.g., above 45 degrees Celsius) due to the weak structure of the deformable membrane with focus fluid inside the cavity. Further, the assembly is susceptible moisture and environmental effects, thereby limiting the lifespan. For example, certain material choices for the deformable membrane attract dust. Finally, and most critically, the fluid lens is susceptible to leakage over the lifetime of usage.

Because of the problems noted with the electro wetting, fluid injection, and mechanical actuation methods for varying an optical property of a deformable lens element, designers of commercially deployed optical systems continue to rely almost exclusively on traditional motor-actuated rigid lens elements in the design of optical systems. Yet, the miniaturization and energy conservation achievable with motor-actuated rigid element equipped optical systems continues to be limited.

SUMMARY OF THE INVENTION

In one aspect of the invention, a lens element is provided that includes a housing and a light transmissive cover coupled to the housing. A first elastic solid lens is disposed within the housing and is characterized by a first durometer hardness. The first elastic solid lens has a first surface oriented toward a light source and an opposing second surface adjacent the light transmissive cover; the first and second surfaces of the first lens defining a first lens thickness. A second elastic solid lens has a first surface oriented toward the light source and an opposing second surface adjacent and substantially conforming to the first surface of the first elastic solid lens. The first and second surfaces of the second lens define a second thickness. Further, the second lens characterized by a second durometer hardness. The second lens thickness is less than the first lens thickness, and the second durometer hardness is greater than the first durometer hardness.

In one example, the first durometer hardness of the first elastic solid lens is less than OO60 as measured by the Shore method, and the second durometer hardness of the second elastic solid lens is in the range of A20 to A60 as measured by the Shore method.

In another example, the first durometer hardness is less than OO30.

In yet another example, the second durometer hardness is in the range of A25 to A35.

In another aspect of the invention, the first thickness is in the range of 0.5 millimeters to 0.8 millimeters and the second thickness is in the range of 12.5 micrometers to 0.20 millimeters.

In another aspect of the invention, an indicia reading terminal is provided that includes an imaging assembly including an image sensor having a plurality of pixels. The indicia reading terminal further includes memory for storing image data, and a controller for processing the image data for attempting to decode decodable indicia represented in the image data. The indicia reading terminal further includes a lens assembly for focusing an image of a target onto the image sensor. The lens assembly includes a light transmissive cover, a first elastic solid lens disposed adjacent the light transmissive cover, and a second elastic solid lens disposed adjacent to and substantially conforming to the first elastic solid lens. The first elastic solid lens is characterized by a first thickness and a first durometer hardness. The second elastic solid lens is characterized by a second thickness and a second durometer hardness. The first lens thickness is greater than the second lens thickness, and the first durometer hardness is less than the second durometer hardness. The indicia reading terminal is operative to move a lens setting of the lens assembly between at least first and second different lens settings. The lens assembly has a first plane of optimum focus at the first lens setting and a second plane of optimum focus at the second lens setting. The indicia reading terminal is further operative to expose a first frame of image data with the lens assembly at the first lens setting and a second frame of image data with the lens assembly at the second lens focus setting. The terminal is further configured so that the terminal is operative to subject each of the first and second frames of image data to a decode attempt for decoding of a decodable indicia.

In another aspect of the invention, an indicia reading terminal is provided that includes a laser source emitting laser light, and a scanning apparatus for scanning the laser light across the target. The terminal is operative so that a plane of optimum focus of the laser light scanned across the target varies based on a present lens setting of the lens assembly. The indicia reading terminal further includes a lens assembly for focusing an image of a target onto the image sensor. The lens assembly includes a light transmissive cover, a first elastic solid lens disposed adjacent the light transmissive cover, and a second elastic solid lens disposed adjacent to and substantially conforming to the first elastic solid lens. The first elastic solid lens is characterized by a first thickness and a first durometer hardness. The second elastic solid lens is characterized by a second thickness and a second durometer hardness. The first lens thickness is greater than the second lens thickness, and the first durometer hardness is less than the second durometer hardness. The terminal is operative to move the lens assembly between a first lens setting and a second lens setting, and is further operative to generate a first signal corresponding to a first scan with the lens assembly at the first lens setting and a second signal corresponding to a second scan with the lens assembly at the second lens setting. The terminal is further operative to attempt to decode a decodable indicia utilizing the first signal and the second signal.

In another aspect of the invention, a method is provided for manufacturing a lens element. The method includes the steps of providing a housing and a light transmissive cover, forming a first elastic solid lens from polydimethylsiloxane cross linked with an agent in a ratio of greater than 20:1, securing the first elastic solid lens within the housing adjacent to the light transmissive cover, forming a second elastic solid lens from fluorinated ethylene propylene, and securing the second elastic solid lens within the housing adjacent to the first elastic solid lens.

In one example, a thickness of the first elastic solid lens is in a range of 0.5 millimeters to 0.8 millimeters, and a thickness of the second elastic solid lens is in the range of 12.5 micrometers to 25 micrometers.

In another aspect of the invention, a method is provided for manufacturing a lens element. The method includes the steps of providing a housing and a light transmissive cover, forming a first elastic solid lens from polydimethylsiloxane cross linked with an agent in a ratio of greater than 20:1, securing the first elastic solid lens within the housing adjacent to the light transmissive cover, forming a second elastic solid lens from polydimethylsiloxane cross linked with an agent in a ratio less than 10:1, and securing the second elastic solid lens within the housing adjacent to the first elastic solid lens.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 7 schematically illustrates a cross sectional view of the lens element from FIG. 2A in an actuated state;

FIG. 8 schematically illustrates a cross sectional view of a lens element in an actuated state according to another embodiment of the invention;

FIG. 9 schematically illustrates a cross sectional view of the lens element from FIG. 6 in an actuated state;

FIG. 10 schematically illustrates an embodiment of a variable lens assembly having a focusing apparatus;

FIG. 11 schematically illustrates an embodiment of a variable lens assembly having a focusing apparatus and an additional optical element in series with the focusing apparatus;

DETAILED DESCRIPTION OF THE INVENTION

Figure 1:
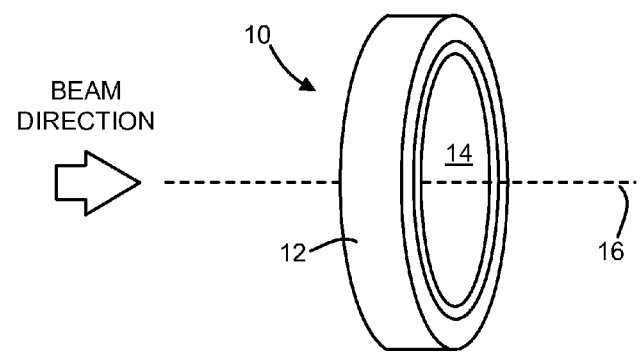
FIG. 1 schematically illustrates a perspective view of a lens element according to an embodiment of the invention.
Figures 2A, 2B:
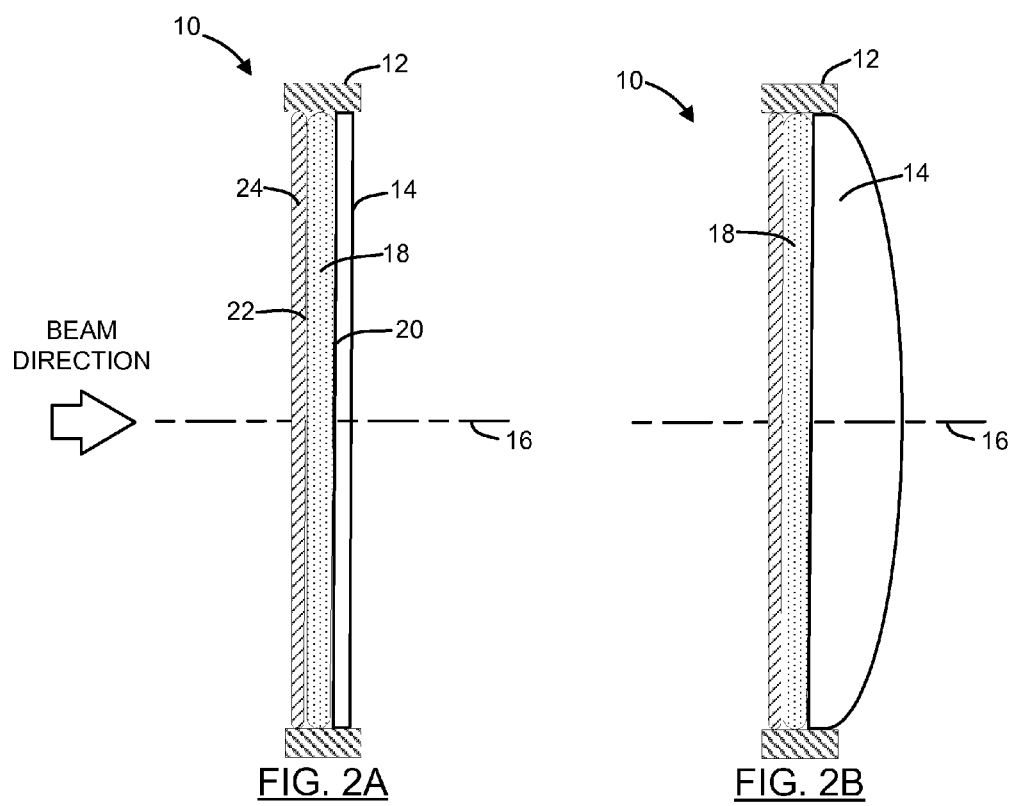
FIGS. 2A and 2B schematically illustrate a cross sectional view of the lens element from FIG. 1 in a non-actuated state.

Referring to FIGS. 1 and 2A, there is shown a perspective and cross sectional side views respectively of a lens element 10. The lens element 10 includes a housing 12, two light transmissive elastic solid lenses, and a light transmissive cover 14. In the illustrated embodiment, the housing 12 is a simple ring-like construction into which the cover 14 is press-fit. The two lenses are nested against the cover 14. Other constructions for the housing 12 are possible, as will be explained in detail below. Together, the two elastic solid lenses and the cover 14 define an optical axis 16.

The light transmissive cover 14 may be provided by a solid light transmissive material with or without optical power, or by a deformable membrane capable of exhibiting curvature for definition of a lens surface having optical power, such as that illustrated in FIG. 2B. In the illustrated embodiment, the light transmissive cover 14 is a solid piece of glass.

A first elastic solid lens 18 is disposed within the housing 12. The first lens 18 is bounded on one side 20 by the cover 14, on the opposing side 22 by a second elastic solid lens 24, and around its outer diameter periphery by the housing 12. The first lens 18 is further characterized by its soft yet elastic nature. In one example, the first lens 18 has a durometer hardness of less than OO60 as measured by a Shore method, such as ASTM D2240, ISO 7619 and ISO 868, DIN 53505, or JIS K 6253. In another example, the durometer hardness is less than OO30. By way of non-limiting comparison, the first elastic solid lens 18 exhibits properties akin to sponge rubber or soft gel. The material of the first elastic solid lens 18 may exhibit viscoelastic properties, meaning that when undergoing deformation over short time intervals the material acts like an elastic solid, but at long time intervals the material acts like a viscous liquid. Preferably, the material of the first lens 18 exhibits an elastic properties, wherein the material will fully recover to its original state upon removal of the load.

One possible material for the first elastic solid lens 18 is polydimethylsiloxane (PDMS). PDMS is a silicon-based organic polymer prepared by polymerization and cross-linking with a cross-linking agent such as CAS registry number 63394-02-5 (part B of Dow Corning Sylgard 184 silicon elastomer kit). By varying the ratio of the PDMS to the cross-linking agent, durometer hardness values may be achieved that satisfy the requirements of the first elastic solid lens 18. In one example, the PDMS is mixed with a cross-link agent in a ratio greater than 20:1, e.g., 20 volumes PDMS solution to 1 volume linking agent, to yield a durometer hardness of approximately OO60. In another example, the PDMS is mixed with a cross-link agent in a ratio of approximately 40:1 to yield a durometer hardness of approximately OO30. In yet another example, for reasons which will be explained below, the PDMS is mixed with a cross-link agent in a ratio of approximately 55:1 to yield a durometer hardness of approximately OO10 and a Young's Modulus of less than 10 kilopascals. Although current laboratory techniques may limit the degree to which a practical upper ratio may be achieved, the inventors believe a ratio of 100:1 or more may yield a durometer hardness much less than OO10, which is very desirable for the first elastic solid lens 18.

The second elastic solid lens 24 is disposed adjacent to the first elastic solid lens 18, substantially conforming to the contour of the first lens. The second lens 24 is bounded on one side by the opposing side 22 of the first elastic solid lens 18, and around its outer diameter periphery by the housing 12. The second elastic solid lens 24 is also characterized by its soft yet elastic nature. However, in contrast to the first lens 18, the second lens 24 is much more firm. By way of non-limiting comparison, the second elastic solid lens 24 exhibits hardness properties akin to leather (except, of course, the lens 24 is light transmissive). In one example, the second elastic solid lens 24 has a durometer hardness in the range of A20 to A60 as measured by the Shore method. Preferably, the second elastic solid lens 24 has a durometer hardness in the range of A25 to A35.

The second elastic solid lens 24 may also be constructed from PDMS. In contrast to the first lens 18, however, the second lens 24 is mixed with a greater volume of cross-link agent to achieve the firmer elastic lens. In one example, the PDMS is mixed with a cross-link agent in a ratio less than 10:1, e.g., 10 volumes PDMS solution to 1 volume linking agent. In another example, the PDMS is mixed with a cross-link agent in a ratio less than 5:1 to yield a durometer hardness of approximately A30 and a Young's Modulus of approximately 950 kilopascals.

The second elastic solid lens 24 serves as a thin barrier between the first elastic solid lens 18 and an actuator mechanism, as will be described in detail below. The second lens 24 thus has a thickness less than the first lens 18. In one embodiment, the thickness of the second elastic solid lens 24 is less than half the thickness of the first elastic solid lens 18. For example, the first lens 18 may be comprised of PDMS and have a thickness of 0.5 millimeters (mm), and the second lens 24 may also be comprised of PDMS and have a thickness of 0.2 mm. In yet another example, the first lens 18 may be comprised of PDMS and have a thickness of 0.8 millimeters (mm), and the second lens 24 may also be comprised of PDMS and have a thickness of 0.1 mm.

In another embodiment, the second lens 24 may be made from an optically clear film, such as DuPont™ fluorinated ethylene propylene (FEP) film available from E.I. du Pont de Nemours and Company. The film 24 may have a thickness of 12.5 μm (0.5 mil) or 25 μm (1 mil), for example, while the first lens 18 may be comprised of PDMS and have a thickness of 0.8 mm. The film 24 may have one surface plasma treated to improve the adhesion to the first lens 18.

Figure 3:
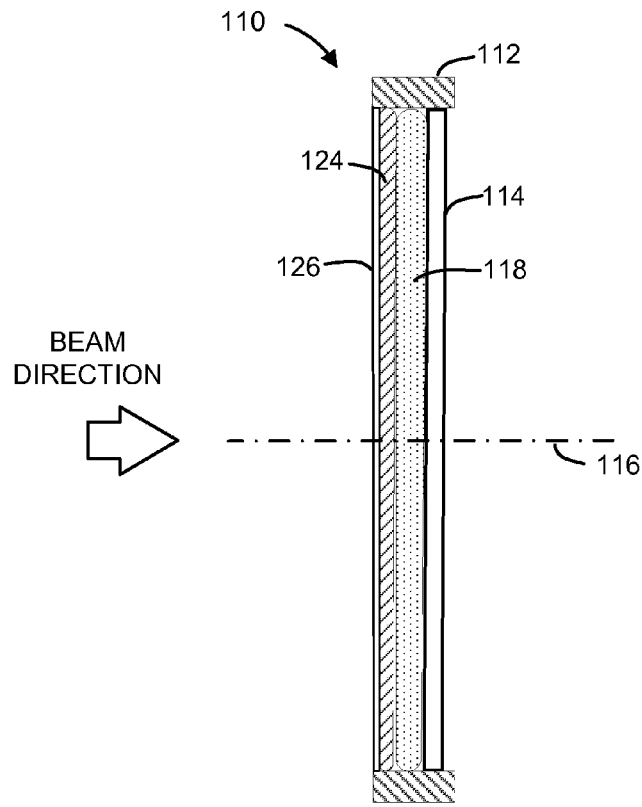
FIG. 3 schematically illustrates a cross sectional view of the lens element from FIG. 1 according to another embodiment of the invention.

Referring to FIG. 3, in yet another example a lens element 110 may include a housing 112, a cover 114, and a soft first elastic solid lens 118 substantially as disclosed with reference to FIG. 2A. The lens element 110 further includes a plurality of firmer lenses in order to achieve acceptable spherical properties. In the illustrated example, the lens element 110 includes a second elastic solid lens 124 and a third elastic solid lens element 126, both of which have a durometer hardness in the range of A20 to A60 as measured by the Shore method. The second elastic solid lens 124 may be made from PDMS and have a thickness in the range of 0.1 mm to 0.2 mm, and the third elastic solid lens element 126 may be made from FEP and have a thickness in the range of 12.5 μm to 25 μm (0.5 mil to 1 mil).

Figure 4:
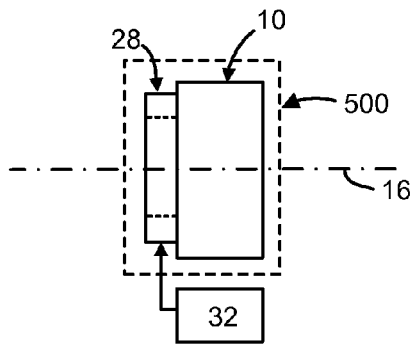
FIG. 4 schematically illustrates a focusing apparatus including an actuator assembly.
Figure 5:
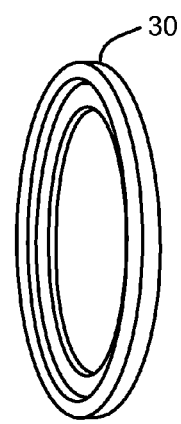
FIG. 5 schematically illustrates a perspective view of a ring shaped member.

Energy can be input to the lens element to change an optical characteristic e.g., focal length, or plane of nominal focus. The disclosed lens element in combination with additional elements that render optical characteristics of the lens element capable of being changed can be regarded as a focusing apparatus 500. Referring now to the embodiment of FIG. 4, the focusing apparatus 500 can be regarded as including lens element 10 as described herein including at least the first elastic solid lens 18 and the second elastic solid lens 24 in combination with an actuator assembly 28. The actuator assembly 28 in the embodiment of FIG. 4 can include e.g., an electrochemical muscle actuator, a piezoelectric actuator, or a voice coil and can further comprise a ring shaped member operative so that when the ring shaped member imparts a force on the first elastic solid lens 18, an area of lens 18 about optical axis 16 bulges outward. A ring shaped member 30 that can be incorporated as part of the actuator assembly 28 for imparting a force on the first elastic solid lens 18 is shown in FIG. 5. Referring back to FIG. 4, an electrical power input unit 32 may be provided in association with the focusing apparatus 500 for supplying input electrical power for changing an optical characteristic of the lens element 10. In the embodiment of FIG. 4, electrical power input unit 32 provides input power to actuator assembly 28.

Figure 6:
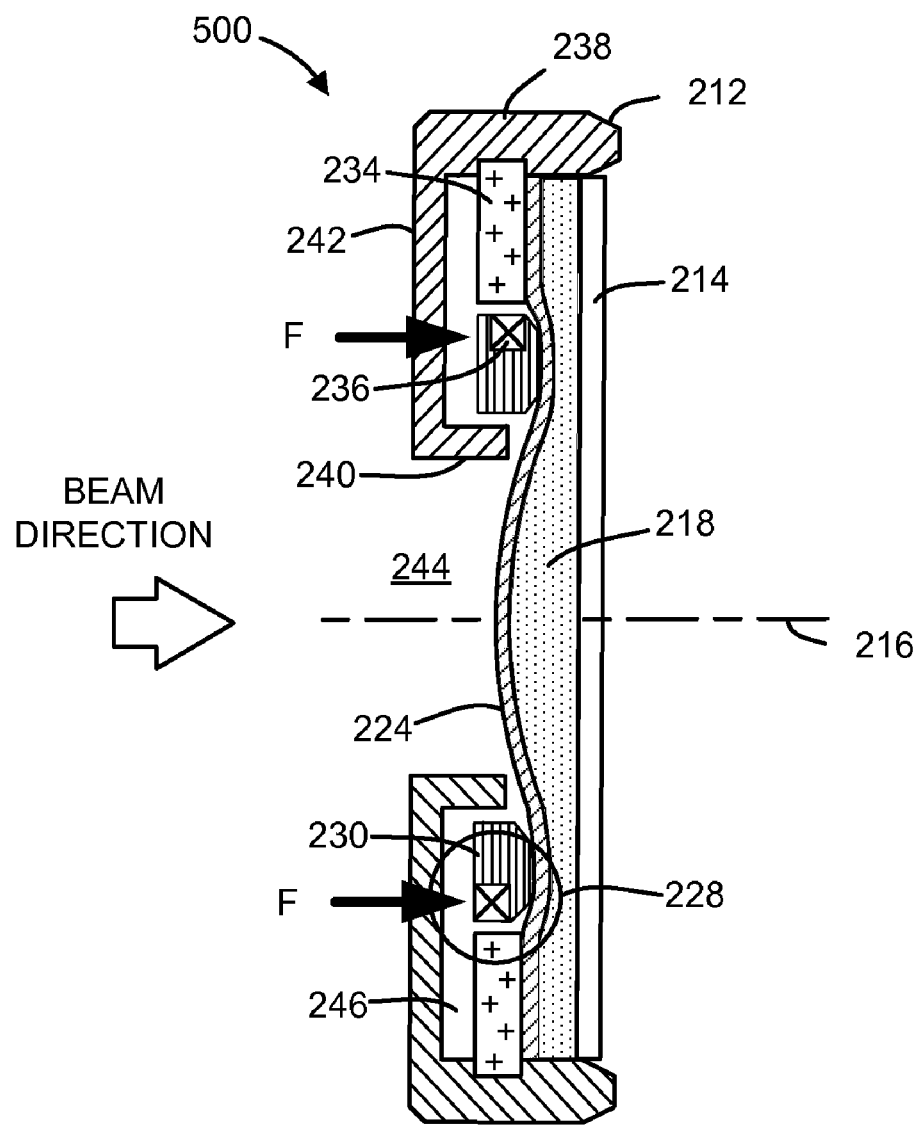
FIG. 6 schematically illustrates a physical form view of a focusing apparatus in combination with an electrical power input unit, wherein the focusing apparatus comprises an actuator assembly that includes a voice coil.

A physical form view of an exemplary focusing apparatus 500 in accordance with the embodiment of FIG. 4 is shown in FIG. 6. In the illustrated example, an actuator assembly 228 includes a voice coil actuator which can comprise a permanent magnet 234 and a wire coil 236. A housing 212 defines a cylindrical outer ring 238 and a cylindrical inner post 240 joined by a plate section 242. The inner post 240 can be hollow, forming a center bore 244 aligned with the optical axis 216, through which the light rays pass. The housing 212 further defines an interior region 246 formed therein to capture and hold the voice coil components, namely, the permanent magnet 234 and wire coil 236. Within the interior region 246 in the described embodiment, the permanent magnet 234 is secured to the inner diameter of the outer ring 238. A ring shaped member 230 having disposed therein the wire coil 236 floats within the remaining interior region 246. The first elastic solid lens 218, the second elastic solid lens 224, and the light transmissive cover 214 in the described embodiment are secured to the inner diameter of outer wall 238. Technologies that are disclosed in U.S. patent application Ser. No. 12/432,480 entitled "FOCUSING APPARATUS AND TERMINAL COMPRISING VARIABLE FOCUS LENS ASSEMBLY" filed Apr. 29, 2009, and incorporated herein by reference in its entirety (including focusing apparatus technologies) can be used with systems, apparatuses, and methods described herein.

In operation, an appropriate electric current is passed through the wire coil 236 for generation of a magnetic field. The magnetic field interacts with the magnetic field induced by the permanent magnet 234 according to the Lorentz law, imparting a driving force F at right angles to both the direction of the current and magnetic flux. In the disclosed embodiment, the force F is imparted in a direction substantially parallel with the optical axis 216 as shown by the arrow in FIG. 6. Further, to prevent plastic deformation and wear to those portions of the second elastic solid lens 224 that transmit light rays, the ring shaped member 230 is adapted to impart the force F at a continuum of force importation points formed in an area pattern offset from axis 216. The force is imparted in an area pattern offset from axis 216 because otherwise, repeated cycling of the lenses 218 and 224 by a direct force within the optical path may alter the optical characteristics of the lenses over time, which is undesirable.

The amount of force F can be directly proportional to the current passing through wire coil 236. The force F can cause the ring shaped member 230 to move in a direction along the optical axis 216. The magnetic force developed in the coil 236 pushes the ring shaped member 230 into the deformable second elastic solid lens 224, which is then forced into the softer first elastic solid lens 218. In this manner, the second, firmer lens 224 acts as a taught skin over the soft gel-like material of the first lens 218. Because the first lens 218 is constrained by the second lens 224, the housing 212, and the cover 214 e.g., everywhere except the central diameter, the action of the second lens 224 causes the soft first lens 218 to spherically bulge outward in the plane of the optical axis 216 in a manner to create a convex lens surface. In the embodiment shown, the lenses 218 and 224 are configured to deform along a direction opposite to the direction of the force F. Due to the nature of voice coil design, extremely accurate movements can be achieved in very small time periods, allowing the focusing apparatus 500 to be regulated with great precision.

Computer models of the embodiment shown in FIG. 2A were generated and simulations were conducted to assess the deformation of the first and second elastic solid lens 18, 24 when a force was applied by the actuator assembly 28. Referring to FIG. 7, the model included the cover 14, the first elastic solid lens 18, the second elastic solid lens 24, and the actuator assembly 28 along with appropriate boundary conditions to simulate the housing (not shown). The first lens 18 was 0.8 mm thick and comprised PDMS mixed in a ratio of 55:1. The second lens 24 was 0.2 mm thick, and comprised PDMS mixed in a ratio of 10:1. Under a simulated force F of 0.02 N, the second lens 24 deflected 0.057 mm (hereinafter referred to as "push-in"), denoted as PI-1 in FIG. 7. The degree of bulging at the optical axis 16 (hereinafter referred to as "sag") was 0.084 mm, denoted by S-1. The model predicted the bulging formed an almost perfect spherical shape.

Referring to FIG. 8, a computer model of the embodiment shown in FIG. 3 added a third elastic solid lens element 126 while decreasing the thickness of the second elastic solid lens 124. Specifically, the first lens 118 was 0.8 mm thick and comprised PDMS mixed in a ratio of 55:1. The second lens 124 was reduced to 0.1 mm thick, and comprised PDMS mixed in a ratio of 10:1. The third elastic solid lens element 126 comprised 12.5 μm (0.5 mil) FEP. Under a simulated force F of 0.02 N, the push-in (PI-2) was predicted to be 0.058 mm and the sag (S-2) was predicted to be 0.083 mm. The model also predicted the bulging formed an almost perfect spherical shape. Given that the FEP has a refractive index of 1.344, in another example the third elastic solid lens element 126 comprised 0.1 μm-thick FEP to serve as an antireflective (AR) coating.

Referring to FIG. 9, a computer model of the embodiment shown in FIG. 6 replaced the PDMS second elastic solid lens 224 with 25 μm (1 mil) FEP. In this example, under a simulated force F of 0.02 N, the push-in (PI-3) was predicted to be 0.049 mm and the sag (S-3) was predicted to be 0.074 mm. The model also predicted the bulging formed an almost perfect spherical shape. This embodiment is a noted improvement over the configuration wherein the second elastic solid lens 224 comprises PDMS because the FEP film is less expensive, and does not require mixing, preparation, and curing. Thus, the embodiment utilizing FEP film costs less to manufacture while still providing favorable results.

Although not illustrated, another simulation was run on the model of FIG. 9 substituting 12.5 μm (0.5 mil) FEP for the 25 μm (1 mil) FEP in the second elastic solid lens 224. The results were borderline acceptable. Specifically, under a simulated force F of 0.02 N, the push-in was predicted to be 0.074 mm and the sag was predicted to be 0.095 mm. However, the greater push-in and sag resulted in some level of non-spherical surface shape.

Focusing apparatus 500 can be employed alone or in combination with other optical elements to define a lens assembly 600. Variations of lens assembly 600 comprising focusing apparatus 500 are shown in FIGS. 10 and 11. In the embodiment of FIG. 10, lens assembly 600 comprises focusing apparatus 500. In the embodiment of FIG. 11, lens assembly 600 comprises focusing apparatus 500 and additional optical element 548. The additional optical element 548 can comprise, e.g., a focusing apparatus including an elastic solid lens element, a deformable fluid lens element, a focusing apparatus including an electrowetting fluid lens element, or a traditional non-deformable solid (e.g., glass, polycarbonate) lens element. In another embodiment, lens assembly 600 can comprise a plurality of additional optical elements.

Figure 12:
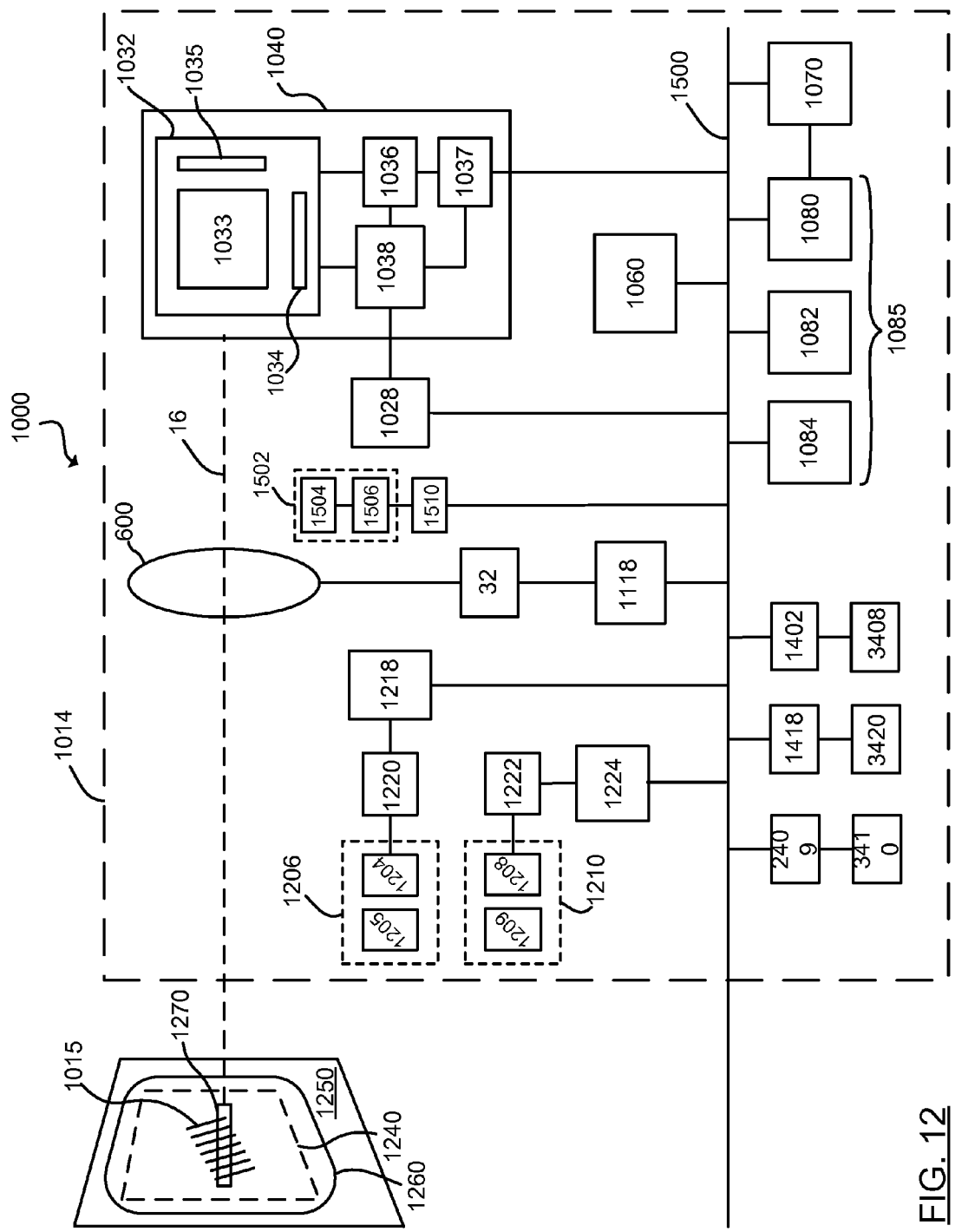
FIG. 12 is a block diagram of an image sensor based indicia reading terminal having a lens assembly according to an embodiment of the invention.

In FIG. 12 there is shown a lens assembly 600 including lens element 10 disposed in an image sensor based indicia reading terminal 1000. Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036, and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. In one example, image sensor integrated circuit 1040 can be provided by an MT9V022 image sensor integrated circuit available from Micron Technology, Inc. In another example, image sensor integrated circuit 1040 can incorporate a Bayer pattern filter. In such an embodiment, CPU 1060 prior to subjecting a frame to further processing can interpolate pixel values intermediate of green pixel values for development of a monochrome frame of image data.

In the course of operation of terminal 1000 image signals can be read out of image sensor 1032, converted and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of terminal 1000, lens assembly 600 can be adapted for focusing an image of a decodable indicia 1015 located within a field of view 1240 on a substrate 1250 onto image sensor array 1033. Imaging light rays can be transmitted about optical axis 16. Lens assembly 600 can be adapted to be capable of multiple focal lengths and multiple best focus distances.

Terminal 1000 can also include an illumination pattern light source bank 1204 and associated light shaping optics 1205 for generating an illumination pattern 1260 substantially corresponding to a field of view 1240 of terminal 1000. The combination of bank 1204 and optics 1205 can be regarded as an illumination pattern generator 1206. Terminal 1000 can also include an aiming pattern light source bank 1208 and associated light shaping optics 1209 for generating an aiming pattern 1270 on substrate 1250. The combination of bank 1208 and optics 1209 can be regarded as an aiming pattern generator 1210. In use, terminal 1000 can be oriented by an operator with respect to a substrate 1250 bearing decodable indicia 1015 in such manner that aiming pattern 1270 is projected on a decodable indicia 1015. In the example of FIG. 10, decodable indicia 1015 is provided by a 1D bar code symbol. Decodable indicia 1015 could also be provided by a 2D bar code symbol or optical character recognition (OCR) characters. Each of illumination pattern light source bank 1204 and aiming pattern light source bank 1208 can include one or more light sources. Lens assembly 600 can be controlled with use of electrical power input unit 32 which provides energy for changing a plane of optimal focus of lens assembly 600. In one embodiment, an electrical power input unit 32 can operate as a controlled voltage source, and in another embodiment, as a controlled current source. Illumination pattern light source bank 1204 can be controlled with use of illumination pattern light source control circuit 1220. Aiming pattern light source bank 1208 can be controlled with use of aiming pattern light source bank control circuit 1222. Electrical power input unit 32 can apply signals for changing optical characteristics of lens assembly 600, e.g., for changing a focal length and/or a best focus distance of (a plane of optimum focus of) lens assembly 600. Illumination pattern light source bank control circuit 1220 can send signals to illumination pattern light source bank 1204, e.g., for changing a level of illumination output by illumination pattern light source bank 1204. Aiming pattern light source bank control circuit 1222 can send signals to aiming pattern light source bank 1208, e.g., for changing a lumen of illumination output by aiming pattern light source bank 1208.

Terminal 1000 can also include a number of peripheral devices including trigger 3408 which may be used to make active a trigger signal for activating frame readout and/or certain decoding processes. Terminal 1000 can be adapted so that activation of trigger 3408 activates a trigger signal and initiates a decode attempt. Specifically, terminal 1000 can be operative so that in response to activation of a trigger signal, a succession of frames can be read out and captured by way of read out of image information from image sensor array 1033 (typically in the form of analog signals) and then storage of the image information after conversion into memory 1080 (which can buffer one or more of the succession of frames at a given time). CPU 1060 can be operational to subject one or more of the succession of frames to a decode attempt. For attempting to decode a bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1118 for coupling electrical power input unit 32 to system bus 1500, interface circuit 1218 for coupling illumination light source bank control circuit 1220 to system bus 1500, interface circuit 1224 for coupling aiming light source bank control circuit 1222 to system bus 1500, and interface circuit 1402 for coupling trigger 3408 to system bus 1500. Terminal 1000 can also include a display 3420 coupled to system bus 1500 and in communication with CPU 1060, via interface 1418, as well as pointer mechanism 3410 in communication with CPU 1060 via interface 2409 connected to system bus 1500.

A succession of frames of image data that can be captured and subject to the described processing can be full frames (including pixel values corresponding to more than about 80% of pixels of image sensor 1032). A succession of frames of image data that can be captured and subject to the described processing (e.g., frame quality evaluation processing) can also be "windowed frames" comprising pixel values corresponding to less than about 80%, and in some cases less than about 50% and in some cases less than 10% of pixels of image sensor 1032. A succession of frames of image data that can be captured and subject to the described processing can also comprise a combination of full frames and windowed frames. A full frame can be captured by selectively addressing for readout pixels of image sensor 1032 corresponding to the full frame. A windowed frame can be captured by selectively addressing for readout pixels of image sensor 1032 corresponding to the windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame.

Figure 13:
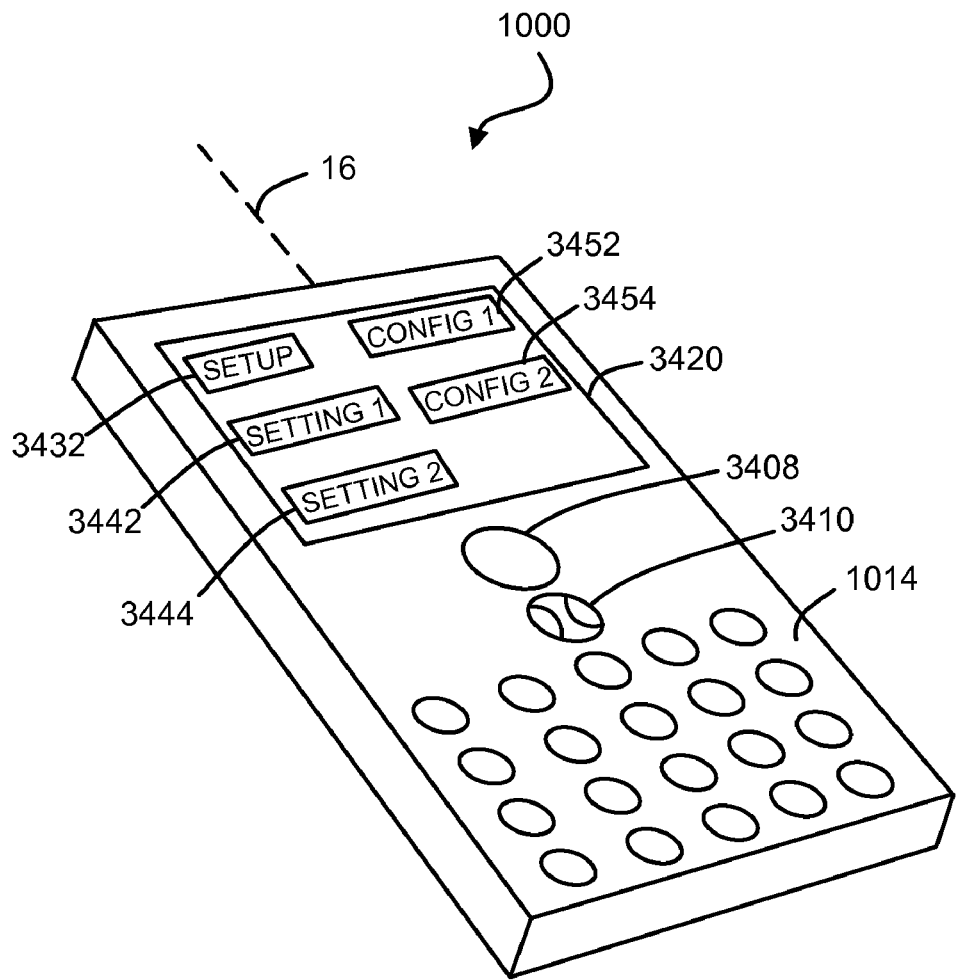
FIG. 13 is a perspective view of an indicia reading terminal having a hand held housing.

A physical form view of terminal 1000 in one embodiment is shown in FIG. 13. Display 3420, trigger 3408, and pointer mechanism 3410 can be disposed on a common side of a hand held housing 1014 as shown in FIG. 13. Display 3420 and pointer mechanism 3410 in combination can be regarded as a user interface of terminal 1000. A user interface of terminal 1000 can also be provided by configuring terminal 1000 to be operative to be reprogrammed by decoding of programming bar code symbols. A hand held housing 1014 for terminal 1000 can in another embodiment be devoid of a display and can be in a gun style form factor.

Referring to terminal 1000, terminal 1000 can be operative to move a lens setting of lens assembly 600 between at least a first plane of optimum focus setting and a second plane of optimum focus setting. Indicia reading terminal 1000 can be operative to move a lens setting of the lens assembly between at least first and second different planes of optimum focus settings, and can further be operative to expose a first frame of image data with the lens assembly at the first plane of optimum focus setting and a second frame of image data with the lens assembly at the second plane of optimum focus setting, and the terminal can further be configured so that the terminal is operative to subject each of the first and second frames of image data to a decode attempt for decoding of a decodable indicia. The second frame can be a successive frame in relation to the first frame or a non-successive subsequent frame in relation to the first frame.

Terminal 1000 can be operative so that terminal 1000, when an operator activated read attempt is actuated by actuation of trigger 3408, can capture a succession of frames and subject one or more of the frames to a decode attempt until a time that the operator activated read attempt is deactivated, e.g., by release of trigger 3408 or a successful decode or a timeout condition being satisfied. In another aspect, terminal 1000 in a first operator activated configuration set forth herein can be operative to move a lens setting of the lens assembly between at least the first and the second lens settings of the lens assembly during a time that the terminal executes an operator activated read attempt of the terminal. Further, the terminal be operative so that first and second frames utilized for a decode attempt are frames exposed during a single operator activated read attempt of the terminal.

Terminal 1000 in a second operator activated configuration set forth herein can be operative to maintain a lens setting of the terminal at a certain lens setting during a time that the terminal executes an operator activated read attempt of the terminal. In addition, terminal 1000 can be operative to move a lens setting in accordance with an operator input command input subsequent to a first operator activated read attempt and prior to a second operator activated read attempt. Terminal 1000 can be further operative so that a first frame and a second frame utilized for a decode attempt are frames exposed during separate first and second separate operator activated read attempts of the terminal.

Terminal 1000 can have a user interface comprising a display 3420 and pointer mechanism 3410, and a user can utilize the user interface to select a lens setting by selection of a displayed button 3442, 3444 corresponding to the desired lens setting. Terminal 1000 can further be operative so that when trigger 3408 is active and to activate a read attempt, terminal 1000 maintains the lens setting at the selected lens setting through the capture of a plurality of frames, including the first and second frames when attempting to decode a decodable indicia in response to a trigger signal being made active to initiate a decode attempt with use of trigger 3408. An operator can select between a first configuration (lens setting moves during read attempts) and second configuration (lens setting is maintained through read attempts) using the user interface of terminal 1000 by selection of a button 3452 (first configuration, moving lens), or button 3454 (second configuration, fixed setting lens), corresponding to the desired configuration.

Further aspects of terminal 1000 in one embodiment are described with reference to the timing diagram of FIG. 14. The timing diagram of FIG. 14 illustrates terminal 1000 undergoing a change in configuration from a first configuration in which a variable lens of terminal 1000 is varied during a read attempt to a second configuration in which a variable lens of terminal 1000 remains at a fixed setting throughout a read attempt.

Figure 14:
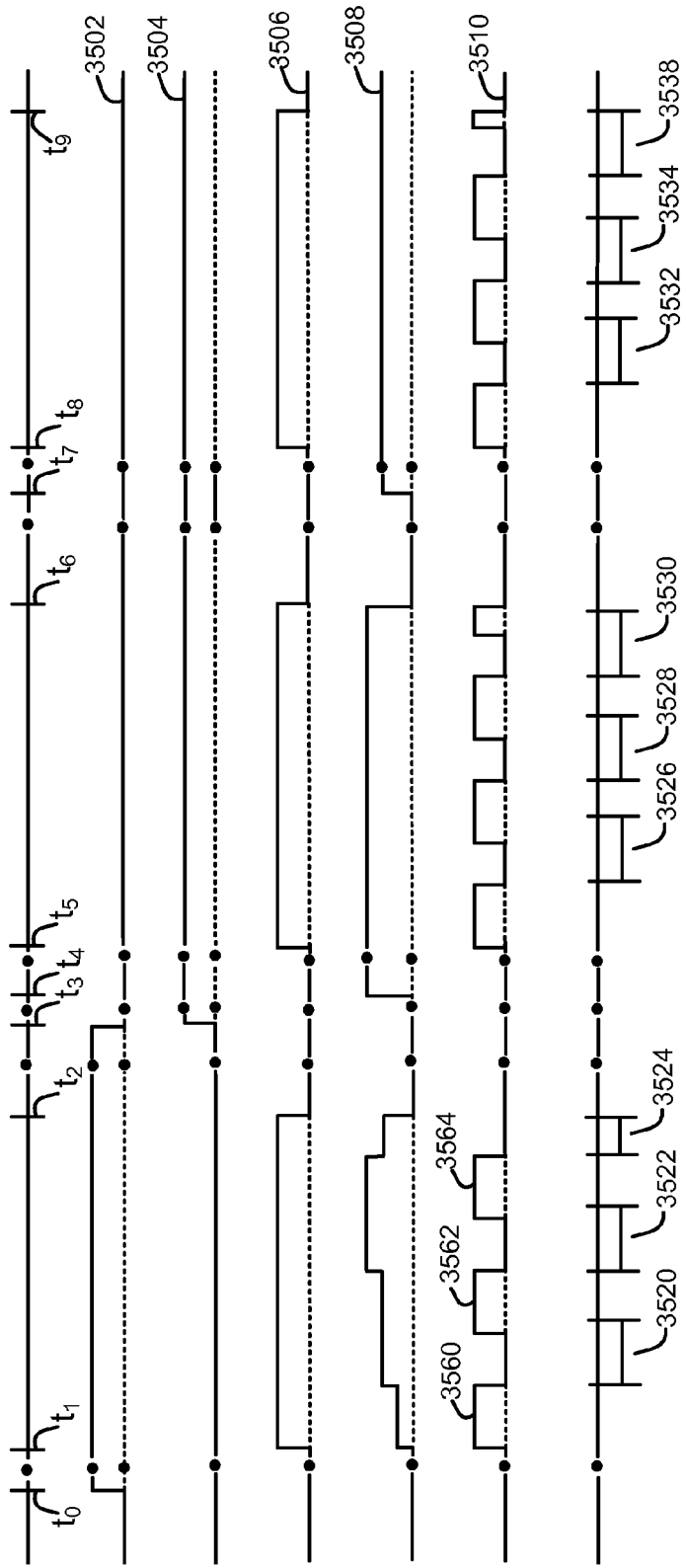
FIG. 14 is a timing diagram illustrating operational aspects of an indicia reading terminal.

Referring to the timing diagram of FIG. 14, signal 3502 is a state signal representing an active or inactive state of the first user selectable configuration. Signal 3504 is a state signal representing the state of a second described user selectable configuration. Signal 3506 is a trigger signal which can be made active by actuation of trigger 3408, and which can be deactivated by releasing of trigger 3408 which may become inactive after a time out period or after a successful decode of a decodable indicia. Signal 3508 represents an energy input level input into lens assembly 600 of terminal 1000. Signal 3510 is an exposure control signal. The exposure control signal transitions from active to inactive states. Exposure periods of terminal 1000 are represented by the active state periods of signal 3510.

Referring to processing periods 3520, 3522, 3524, 3526, 3528, 3530, 3532, 3534, 3538, the noted processing periods can represent processing periods during which time CPU 1060 of terminal 1000 processes stored (e.g., buffered) image data for attempting to decode a decodable indicia.

With further reference to the timing diagram of FIG. 14, an operator at time $t_1$ can select configuration 1 using e.g., button 3452 so that terminal 1000 is set in a configuration in which a lens setting of lens assembly 600 will vary during a read attempt. At time $t_1$, an operator can activate trigger signal 3506. In response to trigger signal 3506 being activated terminal 1000 can expose a plurality of frames of image data.

Referring to the timing diagram of FIG. 14, the energy input level input for establishing a setting of lens assembly 600 is represented by signal 3508 may be at different levels during each of respective exposure periods 3560, 3562, 3564 when terminal 1000 operates in a first (moving lens) configuration. At time $t_2$, trigger signal 3506 can be deactivated e.g., by successful decode or a release of trigger 3408. At time $t_3$, an operator can activate the second configuration as described herein e.g., by actuation of button 3454. Sometime thereafter, an operator may manually select a lens setting of lens assembly 600 e.g., by actuation of a lens setting button 3442, 3444 of terminal 1000 or other provided buttons if terminal 1000 is adapted so that further lens settings are available.

Referring to signal 3508, signal 3508 can be established at an energy level corresponding to the selected lens setting. At time $t_5$, a trigger signal 3506 can be activated again, e.g., by an operator actuation of trigger 3408. A plurality of exposure periods can ensue as seen by signal 3510. When operating in the second configuration, an energization input level into lens assembly 600 and therefore a setting of lens assembly 600 can remain constant. At time $t_6$, trigger signal 3506 can be deactivated e.g., by a release of trigger 3408 or by a successful decode of a message. At time $t_7$, with terminal 1000 still operating in the second configuration, an operator can move a lens setting to a different lens setting e.g., by using a lens setting selection button 3442, 3444 of terminal 1000. In response thereto, an energization level for input energy input into lens assembly 600 can be established at a level correlated to the setting as is seen by signal 3508. A trigger signal 3506 can thereafter be activated again at time $t_8$ and a plurality of exposure periods can ensue with a lens setting remaining at a setting corresponding to the constant lens setting energization level represented by signal 3508 as seen in timing the diagram of FIG. 14. Technologies that are disclosed in U.S. patent application Ser. No. 12/432,480 entitled "FOCUSING APPARATUS AND TERMINAL COMPRISING VARIABLE FOCUS LENS ASSEMBLY" filed Apr. 29, 2009, and incorporated herein by reference in its entirety (including focusing apparatus technologies) can be used with systems, apparatuses, and methods described herein.

Figure 15:
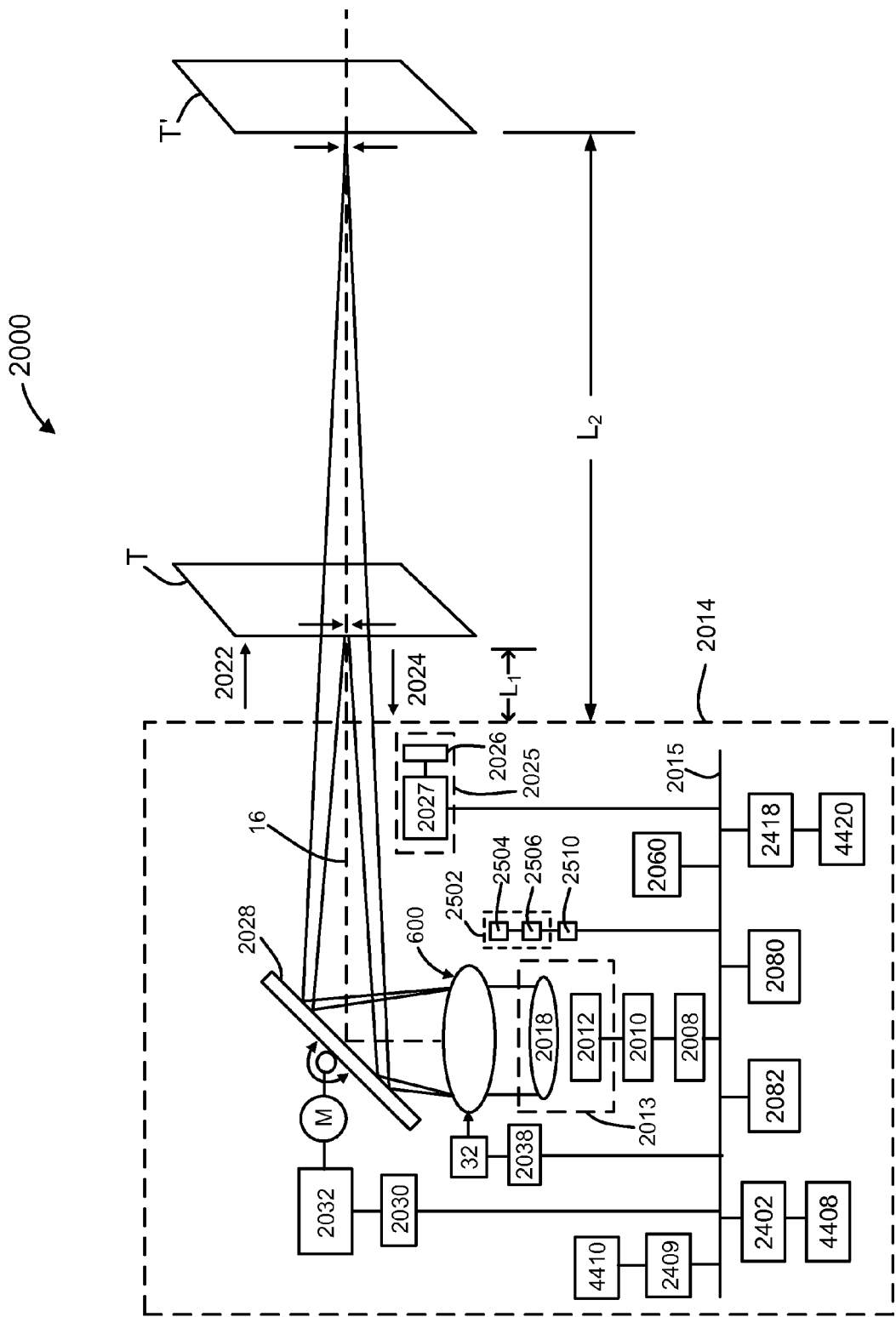
FIG. 15 is a block diagram of a laser scanning based indicia reading terminal having a variable lens assembly.

In FIG. 15 there is shown a lens assembly 600 including lens element 10 disposed in a terminal operative to define a laser scanner based indicia reading terminal 2000.

Referring to FIG. 15, an indicia reading terminal 2000 includes a laser source 2012 supported by a hand held housing 2014. The laser source 2012 can emit a laser beam along an optical axis 16. Laser source 2012 can be coupled to laser source control circuit 2010. Light from laser source 2012 can be shaped by collimating optics 2018 and lens assembly 600. The combination of laser source 2012 and collimating optics 2018 can be regarded as a laser diode assembly 2013. The laser beam travels in an emitting direction 2022 along axis 16 and illuminates a target T, which in one embodiment includes a bar code. A scanning minor reflector 2028 disposed within the optical path defined by axis 16 oscillates to direct the laser beam across the entire surface to be scanned. Reflector 2028 can be driven by scan motor, M, which is coupled to control circuit 2032.

The laser beam reflects off the target T and travels along axis 16 in a receiving direction 2024 back to a detector 2028. In the example wherein the target T includes a barcode, the incident laser light strikes areas of dark and white bands and is reflected. The reflected beam will thusly have variable intensity representative of the barcode pattern. Detector assembly 2025 including detector 2026 and analog to digital converter 2027 can receive the reflected beam of variable intensity, generate an analog signal corresponding to the reflected beam, and convert it to a digital signal for storage into memory 2080 where it can be processed by CPU 2060 in accordance with a program stored in non-volatile memory 2082, provided in a particular example by an EPROM.

For attempting to decode a bar code symbol, CPU 2060 can process a digitized image signal corresponding to a scanned, reflected, and detected laser beam to determine a spatial pattern of dark cells and light cells and can convert each light and dark cell pattern determined into a character of character string via table lookup. Terminal 2000 can include various interface circuits allowing CPU 2060 to communicate with various circuits of terminal 2000 including interface circuit 2008 coupled to circuit 2010 and system bus 2015, interface circuit 2030 coupled to motor control circuit 2032, and interface circuit 2038 coupled to electrical power input unit 32. Terminal 2000 can also include trigger 4408 which can be actuated to initiate a decode attempt. Manual trigger 4408 can be coupled to interface circuit 2402, which in turn can be coupled to system bus 2015. Terminal 2000 can also include a display 4420 in communication with CPU 2060 via interface 2418 as well as pointer mechanism 4410 in communication with CPU 2060 via interface 2409 coupled to system bus 2015.

Referring to further aspects of indicia reading terminal 2000, terminal 2000 can include electrical power input unit 32 for inputting of energy for changing an optical characteristic of focusing apparatus 500, and therefore changing an optical characteristic (e.g., focal length, plane of optimal focus) of lens assembly 600. In one embodiment, an energy input to lens assembly 600 can be varied to vary a plane of optimum focus of a laser beam that is shaped by optics 2018, 200, 2028. A plane (or distance) of optimum focus of a projected laser beam can be varied between a first distance $L_1$ of optimum focus and a second distance $L_2$ of optimum focus.

Figure 16:
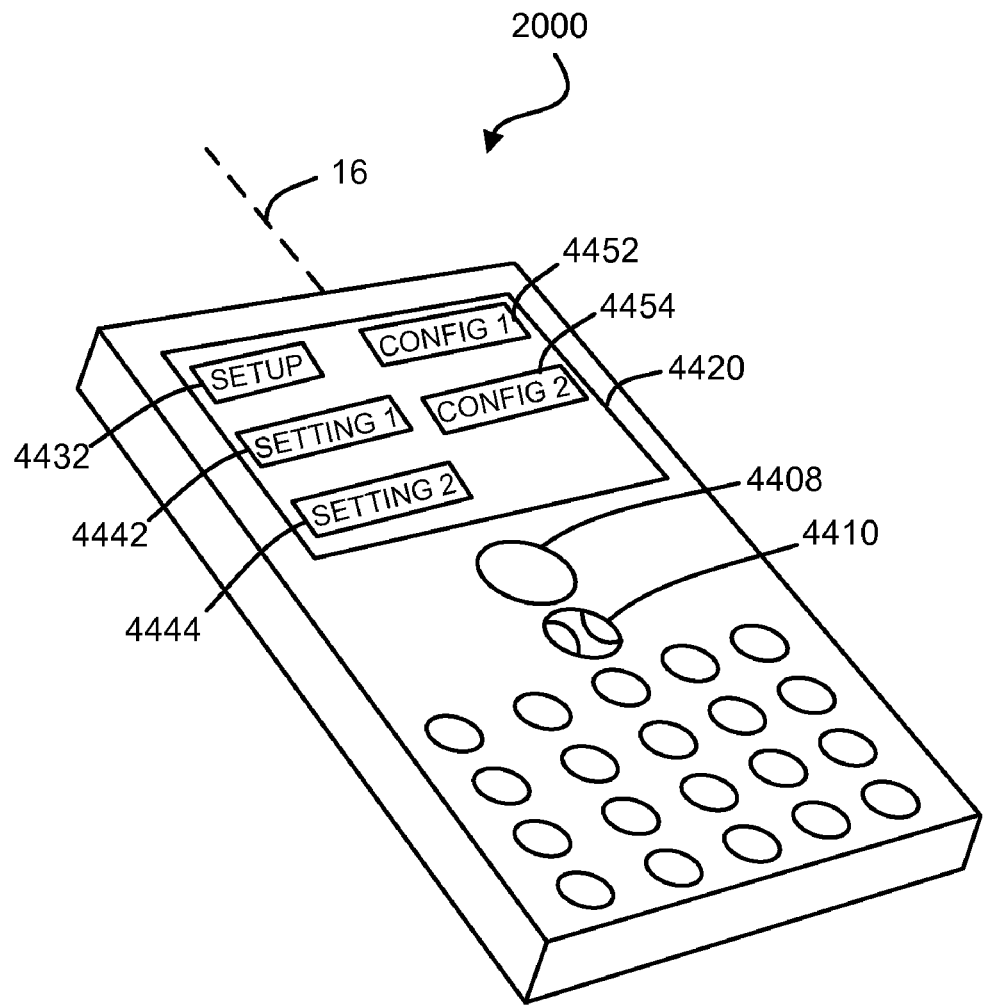
FIG. 16 schematically illustrates a perspective view of an indicia reading terminal having a hand held housing.

A physical form view of a laser scanning based indicia reading terminal 2000 is shown in FIG. 16. Terminal 2000 can include display 4420 and trigger 4408 disposed on a common side of hand held housing 2014. A user interface of terminal 2000 can be provided by display 4420 and pointer mechanism 4410 in combination. A user interface of terminal 2000 can also be provided, e.g., by configuring terminal 2000 to be operative to be programmed by decoding of programming bar code symbols. In another embodiment, hand held housing 2014 can be devoid of a display and can include a gun style form factor.

Referring to terminal 2000, terminal 2000 can be operative to move a lens setting of lens assembly 600 between at least a first plane of optimum focus setting and a second plane of optimum focus setting. Still further, terminal 2000 can be operative to generate at least a first signal corresponding to a first scan with the lens assembly 600 at the first setting and a second signal corresponding to a second scan with the lens assembly at the second setting, and terminal 2000 can be further operative to attempt to decode a decodable indicia utilizing the first signal and the second signal. The second scan to which the second signal corresponds to can be a successive scan in relation to the first scan or a non-successive subsequent scan in relation to the first scan.

Terminal 2000 can be operative so that terminal 2000 can generate a succession of scans and signals corresponding to the scans when an operator activated read attempt is activated by an operator actuation of a trigger 4408. Terminal 2000 can subject one or more generated signals to a decode attempt and the scanning, signal generating, and decode attempting can continue until a read attempt is deactivated e.g., by a release of trigger 4408 or by a successful decode.

Terminal 2000 in a first operator activated configuration set forth herein can be operative to move a lens setting of lens assembly 600 between at least a first and second lens setting of the lens assembly during a time that terminal 2000 executes an operator activated read attempt of the terminal. Further, terminal 2000 can be operative so that the first and second signals are generated during a single operator activated read attempt.

Indicia reading terminal 2000 in a second operator activated configuration set forth herein can be operative to maintain a lens setting of the terminal at a certain lens setting during a time that the terminal executes an operator activated read attempt of terminal 2000. Terminal 2000 can be operative to move the lens setting in accordance to an operator input command input subsequent to a first operator activated read attempt and prior to a second operator activated read attempt. Terminal 2000 can be operative so that the first signal and the second signal are output during separate first and second operator activated read attempts of terminal 2000.

Terminal 2000 can be operative to move the lens setting of lens assembly 600 between the first lens setting and the second lens setting and in other embodiments additional settings in response to a manual selection of a lens setting by an operator. For example, terminal 2000 can have a user interface comprising a display 4420 and pointer mechanism 4410, and an operator can utilize the user interface to select a lens setting by selection of a displayed button 4442, 4444 corresponding to the desired lens setting. Terminal 2000 can further be operative so that when the second configuration is active, terminal 2000 in response to a trigger signal being made active via actuation of trigger 4408, maintains the lens setting at the selected lens setting through the capture of a plurality of signals, including the first and second signals when attempting to decode a decodable indicia in response to a trigger signal being made active to initiate a decode attempt with use of trigger 4408.

The first described functionality where terminal 2000 moves a lens setting between different lens settings during an operator activated read attempt, and the second described functionality where terminal 2000 maintains a lens setting at a certain setting through a read attempt can each be activated in response to an operator selected configuration selection. Terminal 2000 can be operative so that an operator can select between the first and second configurations using the user interface of terminal 2000 by selection of a button 4452 (first configuration), or button 4454 (second configuration) corresponding to the desired configuration.

Figure 17:
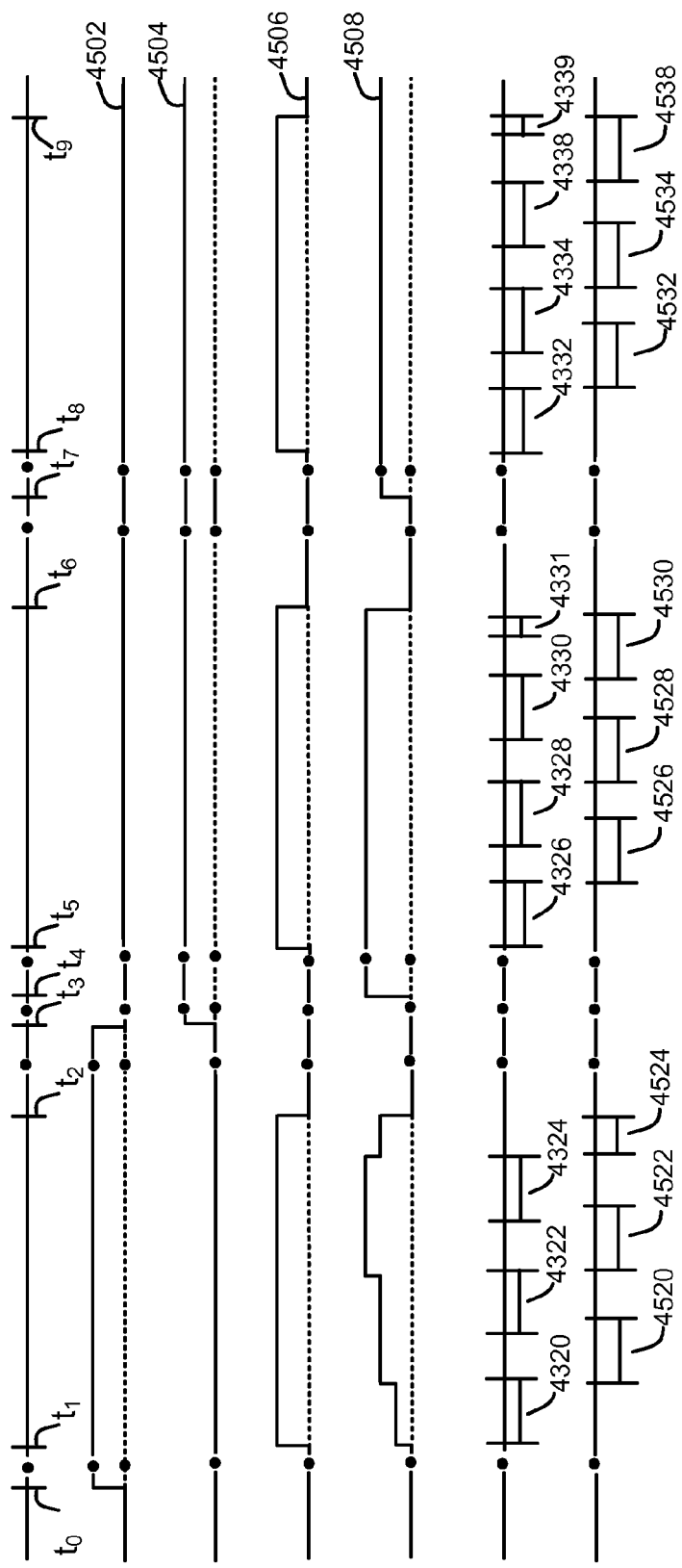
FIG. 17 is a timing diagram illustrating operational aspects of an indicia reading terminal.

A timing diagram further illustrating operation of terminal 2000 in one embodiment is shown in FIG. 17. The timing diagram of FIG. 17 illustrates terminal 2000 undergoing a change in configuration from a first configuration in which a variable lens assembly 600 of terminal 2000 is varied during a read attempt to a second configuration in which a variable lens assembly 600 of terminal 2000 remains at a fixed setting throughout a read attempt.

Referring to the timing diagram of FIG. 17, signal 4502 is a state signal representing an active or inactive state of the first user selectable configuration (moving lens setting). Signal 4504 is a state signal representing the state of a second described user selectable configuration (fixed lens setting). Signal 4506 is a trigger signal which can be made active by actuation of trigger 4408, and which can be deactivated by releasing of trigger 4408 which may become inactive after a time out period or after a successful decode of a decodable indicia. Signal 4506 represents an energy input level input into lens assembly 600 of terminal 2000. Scanning periods 4320, 4322, 4324, 4326, 4328, 4330, 4331, 4332, 4334, 4338, and 4339 are scanning periods during which the described laser beam is scanned across a target for generation of a processable signal.

Referring to processing periods 4520, 4522, 4524, 4526, 4528, 4530, 4532, 4534, 4538, the noted processing periods can represent processing periods during which time CPU 2060 of terminal 2000 processes stored (e.g., buffered) digital signals representing reflected beams reflected from a target for attempting to decode a decodable indicia.

With further reference to the timing diagram of FIG. 17, an operator at time $t_1$ can select configuration 1 using e.g., button 4452 so that terminal 2000 is set in a mode in which a lens setting of lens assembly 600 will vary during a read attempt. At time $t_1$, an operator can activate trigger signal 4506. In response to trigger signal 4506 being activated terminal 2000 can generate a plurality of signals, each representing light reflected from a target during a scan of a light beam thereacross.

Referring to the timing diagram of FIG. 17, the energy input level input for establishing a setting of lens assembly 600 is represented by signal 4508 may be at different levels during each of respective scanning periods 4320, 4322, 4324 when terminal 2000 operates in a first (moving lens) configuration. At time $t_2$, trigger signal 4506 can be deactivated e.g., by successful decode or a release of trigger 4408. At time $t_3$, an operator can activate the second configuration as described herein e.g., by actuation of button 4454. Sometime thereafter, an operator may manually select a lens setting of lens assembly 600 e.g., by actuation of a lens setting button 4442, 4444 of terminal 2000 or other provided buttons if terminal 2000 is adapted so that further lens settings are available.

Referring to signal 4508, signal 4508 can be established at an energy level corresponding to the selected lens setting. At time $t_5$, a trigger signal 4506 can be activated again, e.g., by an operator actuation of trigger 4408. A plurality of scanning periods can ensue as seen by scanning periods 4326, 4328, 4330, 4331. When operating in the second configuration, an energization input level into lens assembly 600 and therefore a setting of lens assembly 600 can remain constant. At time $t_6$, trigger signal 4506 can be deactivated e.g., by a release of trigger 4408 or by a successful decode of a message. At time $t_7$, with terminal 2000 still operating in a second configuration, an operator can move a lens setting to a different lens setting e.g., by using a lens setting selection button 4442, 4444 of terminal 2000. In response thereto, an energization level for establishing a setting of lens assembly 600 can move to a level correlated to the setting as is seen by signal 4508. A trigger signal 4506 can thereafter be activated again at time $t_8$. A plurality of scanning periods 4332, 4334, 4338, 4339 can ensue with a lens setting remaining at a setting corresponding to the constant lens setting energization level during scanning periods 4332, 4334, 4338, 4339 represented by signal 4508 as seen in timing the diagram of FIG. 17. Technologies that are disclosed in U.S. patent application Ser. No. 12/432,517 entitled "LASER SCANNER WITH DEFORMABLE LENS" filed Apr. 29, 2009, and incorporated herein by reference in its entirety (including focusing apparatus technologies) can be used with systems, apparatuses, and methods described herein.

Mode, configuration, or setting selections described herein described as being made with use of a user interface comprising a display and pointer mechanism of terminal 1000 or terminal 2000 can also be made with use of another user interface, e.g., by reading of programming bar code symbols.

One advantage of the disclosed lens element is that, unlike fluid lenses, the elastic lenses will not leak over time because they are solid. Also, eliminating fluid in the lens assembly solves manufacturing and material handling issues.

Another advantage of the disclosed lens element is that the assembly is able to withstand higher temperatures without deforming, which improves optical properties and reduces aberrations. For example, prior art fluid lenses were limited to approximately 45 degrees Celsius. Embodiments of the solid elastic lenses disclosed herein are operable up to 75 degrees Celsius and still function normally as a deformable lens.

Furthermore, in the FEP embodiment, the laminated surface between the housing provides excellent protection against moisture, wear-and-tear, and does not attract dust.

Another advantage of the disclosed lens element is that the FEP film may serve as an antireflective (AR) coating, due to the low reflective index. The FEP film would be quite thin, on the order of 0.1 µm thick, and therefore would require a third elastic solid lens to provide the stiffness (e.g., durometer hardness) to push against the first elastic solid lens to change an optical characteristic.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

We claim:

1. A lens element comprising:
   a housing defining a center bore there through, the bore defining an optical axis;
   a light transmissive cover coupled to the housing; a first elastic solid lens disposed within the housing along the optical axis and characterized by a first durometer hardness, the first elastic solid lens having a first surface oriented toward a light source and an opposing second surface adjacent the light transmissive cover, the first and second surfaces of the first lens defining a first lens thickness;
   and a second elastic solid lens having a first surface oriented toward the light source and an opposing second surface adjacent and substantially conforming to the first surface of the first elastic solid lens, the first and second surfaces of the second lens defining a second thickness, the second lens characterized by a second durometer hardness; wherein the second lens thickness is less than the first lens thickness and the second durometer hardness is greater than the first durometer hardness.

2. The lens element of claim 1, wherein the first durometer hardness of the first elastic solid lens is less than OO60 as measured by the Shore method, and the second durometer hardness of the second elastic solid lens is in the range of A20 to A60 as measured by the Shore method.

3. The lens element of claim 2, wherein the first durometer hardness is less than OO30.

4. The lens element of claim 3, wherein the first durometer hardness is less than OO10.

5. The lens element of claim 2, wherein the second durometer hardness is in the range of A25 to A35.

6. The lens element of claim 1, wherein the thickness of the second elastic solid lens is less than half the thickness of the first elastic solid lens.

7. The lens element of claim 1, wherein the first thickness is in the range of 0.5 millimeters to 0.8 millimeters and the second thickness is in the range of 12.5 micrometers to 0.20 millimeters.

8. The lens element of claim 1, wherein the first elastic solid lens comprises polydimethylsiloxane cross linked with an agent in a ratio of greater than 20:1.

9. The lens element of claim 8, wherein the first elastic solid lens comprises polydimethylsiloxane cross linked with an agent in a ratio of greater than 50:1.

10. The lens element of claim 1, wherein the second elastic solid lens comprises polydimethylsiloxane cross linked with an agent in a ratio less than 10:1.

11. The lens element of claim 10, wherein the second elastic solid lens comprises polydimethylsiloxane cross linked with an agent in a ratio less than 5:1.

12. The lens element of claim 1, wherein the second elastic solid lens comprises fluorinated ethylene propylene.

13. The lens element of claim 1, further comprising a third elastic solid lens adjacent to the second elastic solid lens, the third elastic solid lens having a durometer hardness in the range of A20 to A60.

14. The lens element of claim 13, wherein the second elastic solid lens comprises polydimethylsiloxane and the third elastic solid lens comprises fluorinated ethylene propylene.

15. An indicia reading terminal comprising:
    an imaging assembly including an image sensor having a plurality of pixels;
    a memory for storing image data, and a controller for processing the image data for attempting to decode decodable indicia represented in the image data;
    a lens assembly for focusing an image of a target onto the image sensor, the lens assembly comprising a light transmissive cover, a first elastic solid lens disposed adjacent the light transmissive cover, and a second elastic solid lens disposed adjacent to and substantially conforming to the first elastic solid lens, the first elastic solid lens characterized by a first thickness and a first durometer hardness, the second elastic solid lens characterized by a second thickness and a second durometer hardness, the first lens thickness being greater than the second thickness and the first durometer hardness being less than the second durometer hardness;
    wherein the indicia reading terminal is operative to move a lens setting of the lens assembly between at least first and second different lens settings, the lens assembly having a first plane of optimum focus at the first lens setting and a second plane of optimum focus at the second lens setting, the indicia reading terminal further being operative to expose a first frame of image data with the lens assembly at the first lens setting and a second frame of image data with the lens assembly at the second lens focus setting, and wherein the terminal is further configured so that the terminal is operative to subject each of the first and second frames of image data to a decode attempt for decoding of a decodable indicia.

16. The indicia reading terminal of claim 15, wherein the first durometer hardness of the first elastic solid lens is less than OO60 as measured by the Shore method, and the second durometer hardness of the second elastic solid lens is in the range of A20 to A60 as measured by the Shore method.

17. The indicia reading terminal of claim 16, wherein the first durometer hardness is less than OO30 and the second durometer hardness is in the range of A25 to A35.

18. The indicia reading terminal of claim 15, wherein the terminal is operative to move a lens setting of the lens assembly between the first and the second lens settings of the lens assembly during a time that the terminal executes an operator activated read attempt of the terminal, the terminal further being operative so that the first and second frames are exposed during a single operator activated read attempt of the terminal.

19. The indicia reading terminal of claim 15, wherein the terminal is operative to maintain a lens setting of the lens assembly at a certain lens setting during a time that the terminal executes an operator activated read attempt of the terminal, the terminal being operative to move the lens setting in accordance with an operator input command input subsequent to a first operator activated read attempt and prior to a second operator activated read attempt, the terminal further being operative so that the first frame and the second frame are exposed during separate first and second separate operator activated read attempts of the terminal.

20. An indicia reading terminal comprising:
    a laser source emitting laser light;
    a scanning apparatus for scanning the laser light across the target, wherein the terminal is operative so that a plane of optimum focus of the laser light scanned across the target varies based on a present lens setting of the lens assembly;
    a lens assembly for focusing laser light emitted from the laser source, the lens assembly comprising a light transmissive cover, a first elastic solid lens disposed adjacent the light transmissive cover, and a second elastic solid lens disposed adjacent to and substantially conforming to the first elastic solid lens, the first elastic solid lens characterized by a first thickness and a first durometer hardness, the second elastic solid lens characterized by a second thickness and a second durometer hardness, the first lens thickness being greater than the second lens thickness and the first durometer hardness being less than the second durometer hardness;

wherein the terminal is operative to move the lens assembly between a first lens setting and a second lens setting, and is further operative to generate a first signal corresponding to a first scan with the lens assembly at the first lens setting and a second signal corresponding to a second scan with the lens assembly at the second lens setting, and wherein the terminal is further operative to attempt to decode a decodable indicia utilizing the first signal and the second signal.

21. The indicia reading terminal of claim 20, wherein the first durometer hardness of the first elastic solid lens is less than OO60 as measured by the Shore method, and the second durometer hardness of the second elastic solid lens is in the range of A20 to A60 as measured by the Shore method.

22. The indicia reading terminal of claim 21, wherein the first durometer hardness is less than OO30 and the second durometer hardness is in the range of A25 to A35.

23. The indicia reading terminal of claim 20, wherein the terminal is operative to move a lens setting of the lens assembly between the first lens setting and the second lens settings of the lens assembly during a time that the terminal executes an operator activated read attempt of the terminal, the terminal further being operative so that the first and second signals are generated during a single operator activated read attempt.

24. The indicia reading terminal of claim 20, wherein the terminal is operative to maintain a lens setting of the lens assembly at a certain lens setting during a time that the terminal executes an operator activated read attempt of the terminal, the terminal being operative to move the lens setting in accordance to an operator input command input subsequent to a first operator activated read attempt and prior to a second operator activated read attempt, the terminal further being operative so that the first signal and the second signal are output during separate first and second operator activated read attempts of the terminal.

25. A method for manufacturing a lens element, comprising the steps of: providing a housing and a light transmissive cover; forming a first elastic solid lens from polydimethylsiloxane cross linked with an agent in a ratio of greater than 20:1; securing the first elastic solid lens within the housing adjacent to the light transmissive cover; forming a second elastic solid lens from fluorinated ethylene propylene; and securing the second elastic solid lens within the housing adjacent to the first elastic solid lens.

26. The method of claim 25, further comprising the step of plasma treating a surface of the second elastic solid lens to improve the adhesion to the first elastic solid lens.

27. The method of claim 25, wherein a thickness of the first elastic solid lens is in a range of 0.5 millimeters to 0.8 millimeters, and a thickness of the second elastic solid lens is in the range of 12.5 micrometers to 25 micrometers.

28. A method for manufacturing a lens element, comprising the steps of: providing a housing and a light transmissive cover; forming a first elastic solid lens from polydimethylsiloxane cross linked with an agent in a ratio of greater than 20:1; securing the first elastic solid lens within the housing adjacent to the light transmissive cover; forming a second elastic solid lens from polydimethylsiloxane cross linked with an agent in a ratio less than 10:1; and securing the second elastic solid lens within the housing adjacent to the first elastic solid lens.

29. The method of claim 28, wherein a thickness of the first elastic solid lens is in a range of 0.5 millimeters to 0.8 millimeters, and a thickness of the second elastic solid lens is in the range of 0.10 millimeters to 0.20 millimeters.

* * * * *

UNITED STATES PATENT AND TRADEMARK OFFICE
CERTIFICATE OF CORRECTION

PATENT NO. : 8,366,002 B2  
APPLICATION NO. : 12/787665  
DATED : February 5, 2013  
INVENTOR(S) : Wang et al.

Page 1 of 1

It is certified that error appears in the above-identified patent and that said Letters Patent is hereby corrected as shown below:

Column 18, Line 25: Claim 15, Delete "focus"

Signed and Sealed this
Nineteenth Day of March, 2013

Teresa Stanek Rea
*Acting Director of the United States Patent and Trademark Office*